United States Patent [19]

Krueger

[11] Patent Number: 4,814,126
[45] Date of Patent: Mar. 21, 1989

[54] METHOD FOR CUSTOM FABRICATIONS OF DOORS

[75] Inventor: Vernon C. Krueger, San Jose, Calif.

[73] Assignee: FMC Corporation, Chicago, Ill.

[21] Appl. No.: 174,296

[22] Filed: Mar. 28, 1988

Related U.S. Application Data

[62] Division of Ser. No. 69,743, Jul. 6, 1987, abandoned.

[51] Int. Cl.[4] ............................................. B29C 33/38
[52] U.S. Cl. ................................. 264/45.1; 264/46.4; 264/219; 264/220; 264/225; 249/159
[58] Field of Search ............... 249/155; 264/45.1, 219, 264/220, 225, 226, 227, 46.4

[56] References Cited

U.S. PATENT DOCUMENTS

| | | |
|---|---|---|
| 2,410,888 | 11/1946 | Lucy ................................. 264/219 |
| 3,618,886 | 11/1971 | Graham ............................. 249/155 |
| 4,398,693 | 8/1983 | Hahn et al. ........................ 249/155 |

Primary Examiner—Jan H. Silbaugh
Assistant Examiner—Allan R. Kuhns
Attorney, Agent, or Firm—L. B. Guernsey; R. B. Megley; H. M. Stanley

[57] ABSTRACT

A method for forming a composite door to custom fit a predetermined door opening. A template is formed by spraying a quick hardening foam on a door jam of the door opening. The template is moved a base member of the tool and the base member adjusted to conform to the shape of the template. A mold is formed using the template and base member. Composite material placed inside the mold and on top of the base member forms a door to custom fit the door opening.

3 Claims, 4 Drawing Sheets

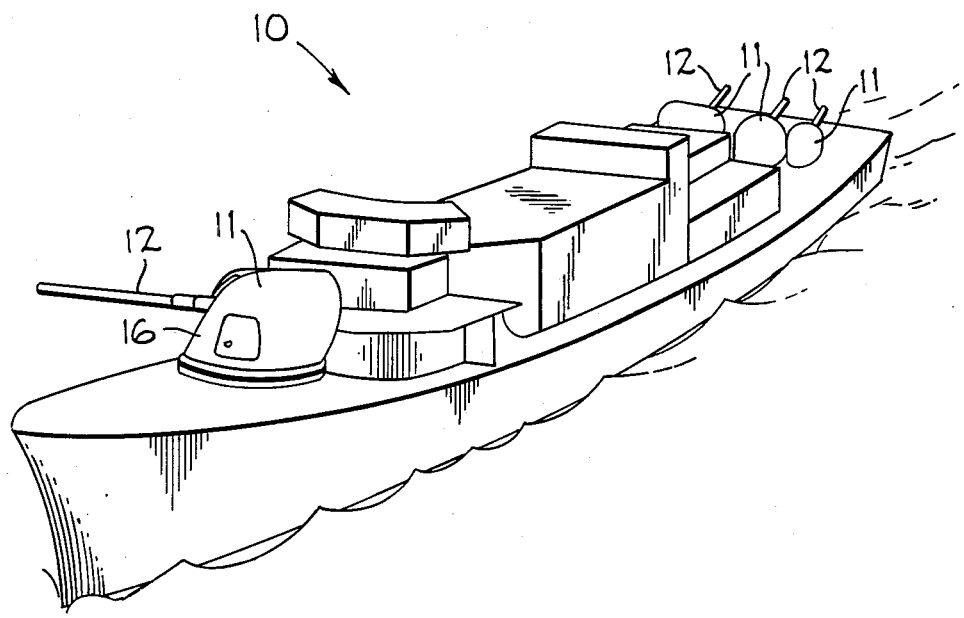
FIG_1
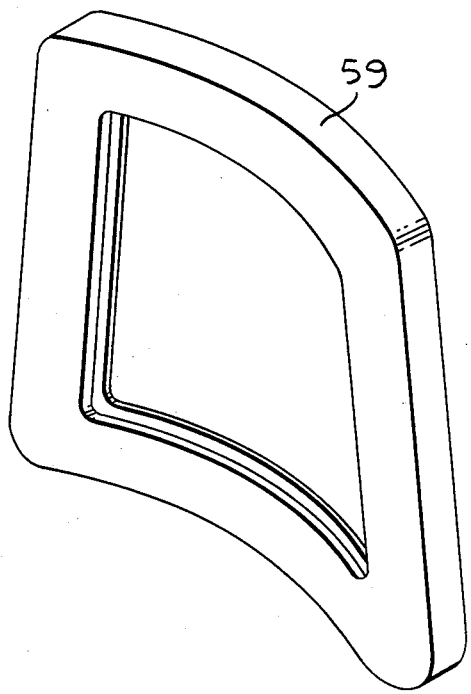
FIG_2
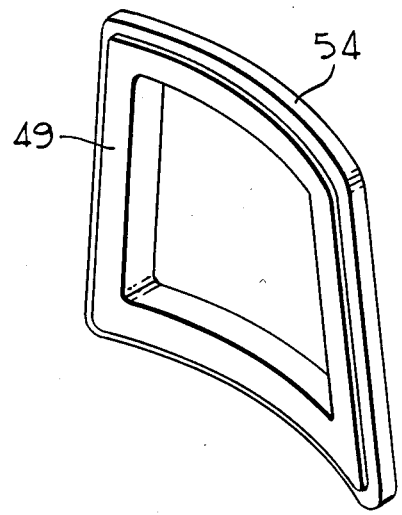
FIG_3

FIG_4
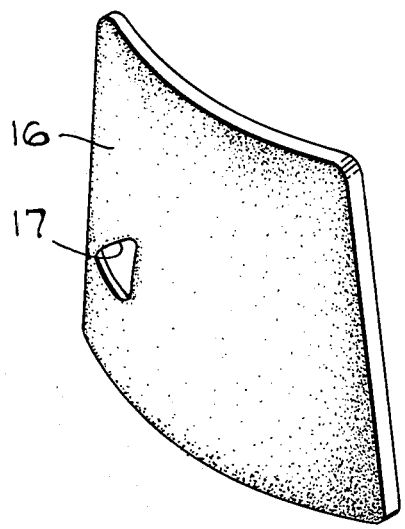
FIG_5
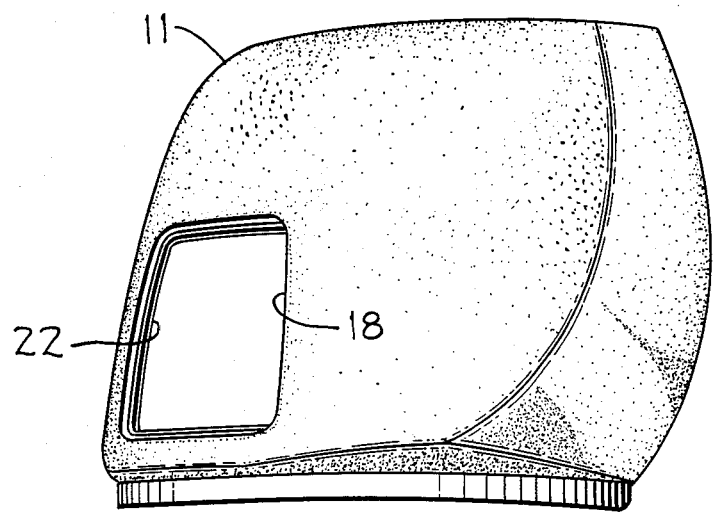

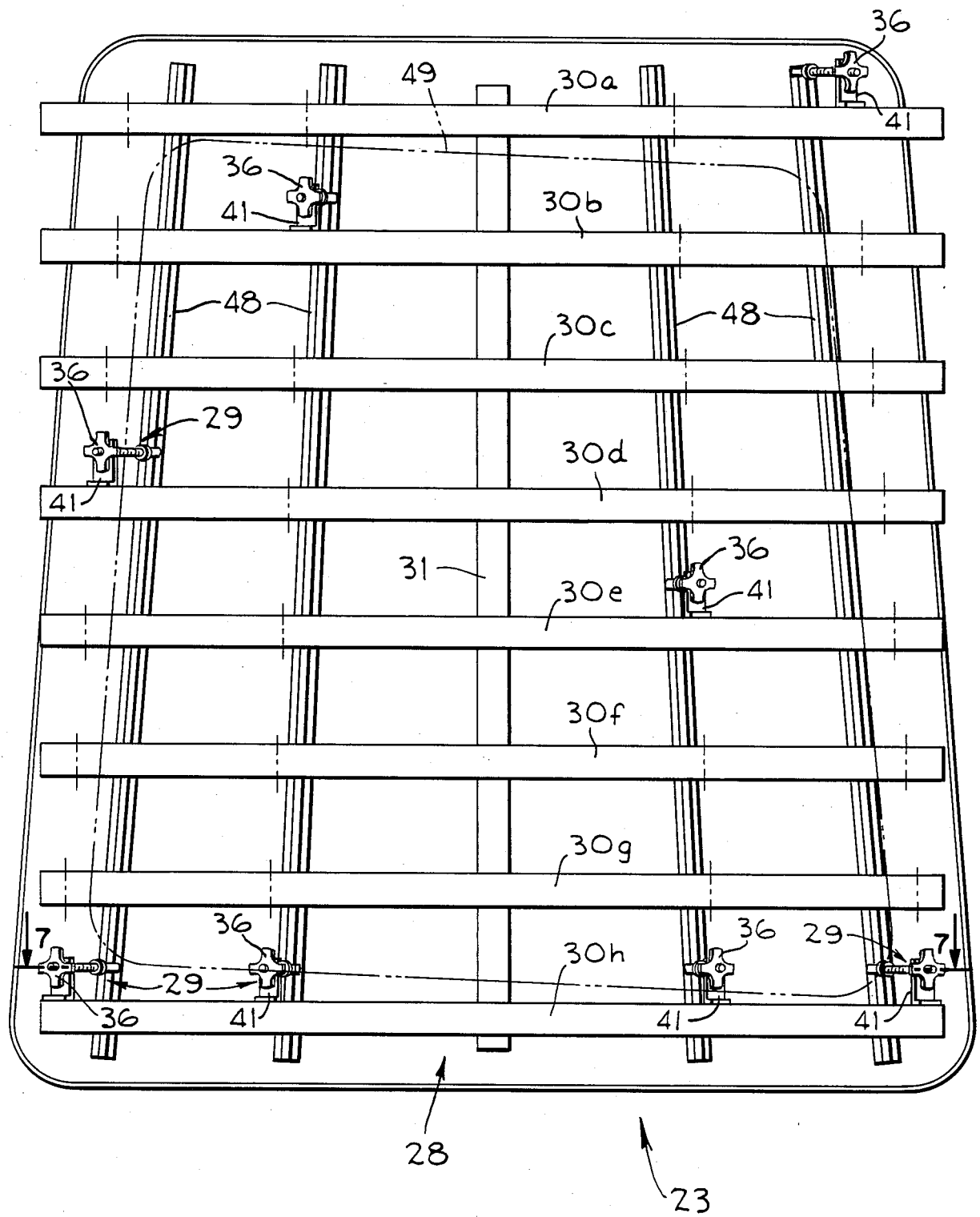

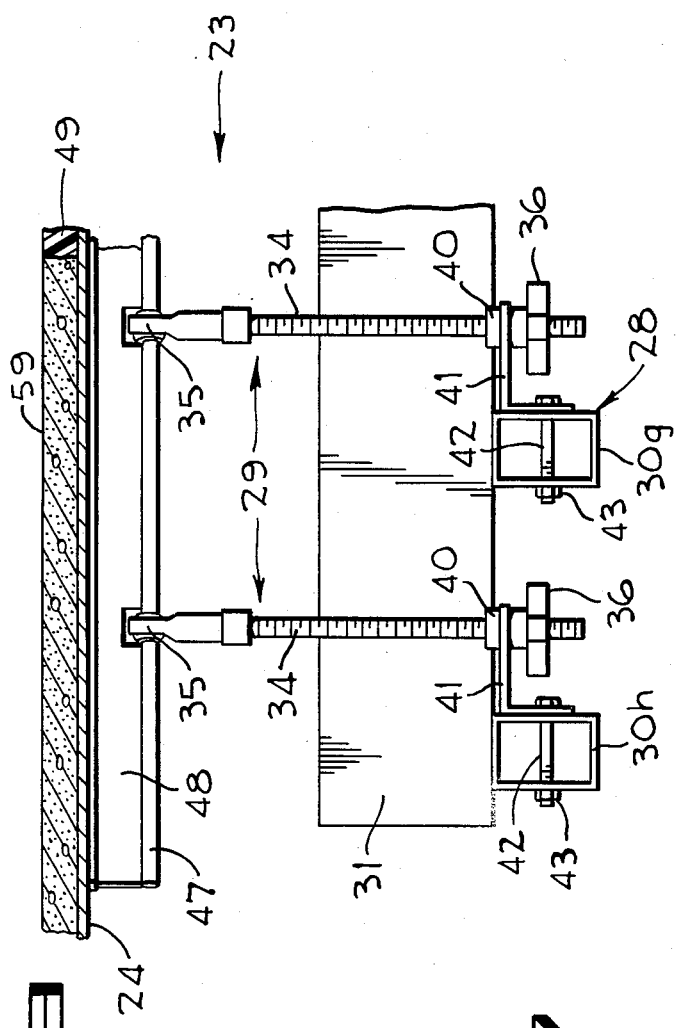
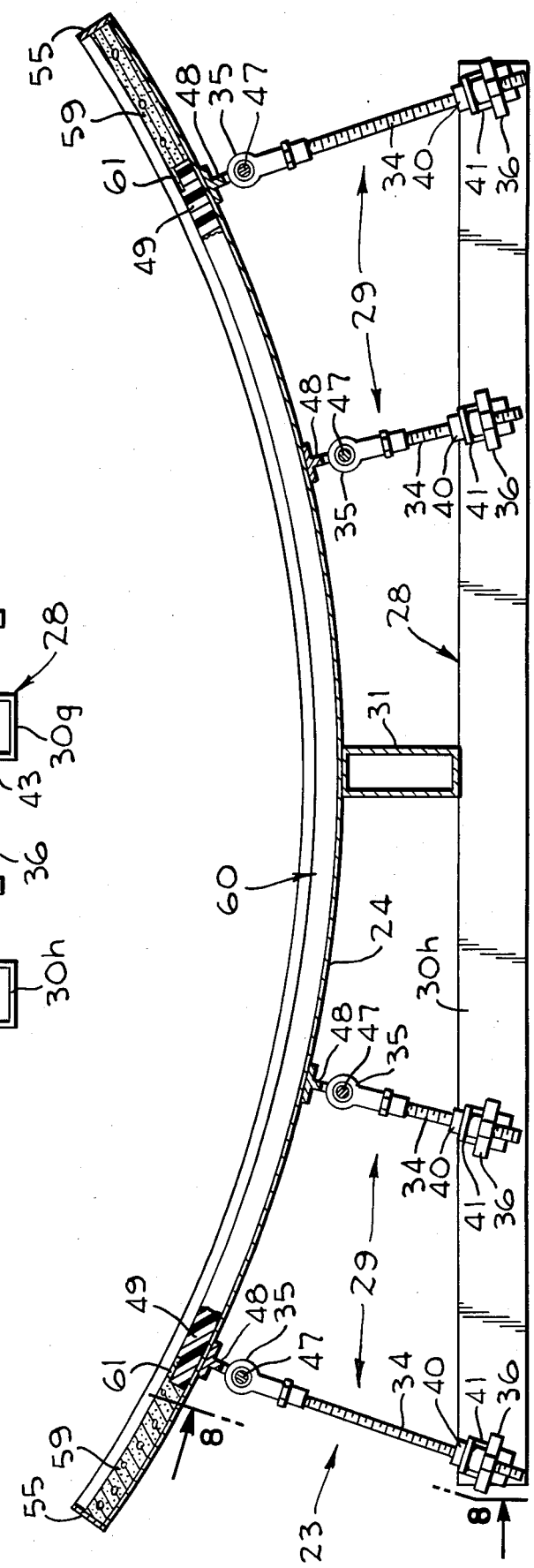
FIG_8
FIG_7

METHOD FOR CUSTOM FABRICATIONS OF DOORS

This is a division of application Ser. No. 07/069,743, filed July 6, 1987, now abandoned.

BACKGROUND OF THE INVENTION

The present invention relates to a method for making doors, and more particularly, to a method for fabricating doors to custom fit a variety of doorways using a single adjustable tool for forming the doors.

In a variety of applications, such as gun turrets on shipboard, doors must be custom made to fit doorways that vary somewhat in size and shape. Gun turrets may be formed from a plurality of metal pieces welded together and having one or more door openings to allow the ship's crew access to a gun. The door openings in the welded turret are each a slightly different size and shape so that individual doors must be custom made to fit the door openings. In order to build metal doors to fit the openings, the doors have been cast in a general shape and size, then the individual doors have been bent, ground and machined to each fit a corresponding opening. This is a slow, costly, time consuming process.

SUMMARY OF THE INVENTION

The method of the present invention can be used to form a fabricated composite door to custom fit a predetermined one of the door openings. A template is formed to the shape and size of the door opening and the template used to adjust the contour of the adjustable tool. The template can be formed on the door jam of the opening by spraying a foam material on the door jam and letting the foam harden. The template is then moved to a position adjacent to a base member of the adjustable tool. A plurality of bracing members mounted between the base member and a rigid frame member are adjusted to conform the base member to the shape of the template. The template is temporarily fixed to the base member and a mold form around the template using the template and base member to determine the shape of the mold. When the mold hardens, the template is removed and the mold secured to the base member. Composite material is placed inside the mold and on top of the base member to form a door having the same size and shape as the corresponding door opening.

BRIEF DESCRIPTION OF THE DRAWINGS

FIG. 1 shows a ship having a gun turret with a door which can be fabricated on the apparatus of the present invention.

FIG. 2 shows an isometric drawing of a mold used in fabricating a door using the present invention.

FIG. 3 shows a template formed inside the door opening of FIG. 7.

FIG. 4 shows a composite door fabricated using the present invention.

FIG. 5 shows a door opening in a gun turret of FIG. 1.

FIG. 6 shows a plan view of the apparatus of the present invention.

FIG. 7 is a side view of the present invention taken along line 7—7 of FIG. 6.

FIG. 8 is a side view of the present invention taken along line 8—8 of FIG. 7.

DESCRIPTION OF THE PREFERRED EMBODIMENT

A ship 10 having a plurality of gun turrets 11 and a plurality of guns 12 is shown in FIG. 1. A door or hatch 16 provides a means for entering and leaving turret 11. The door 16 (FIGS. 1, 4) may include one or more openings 17 for mounting latches and other hardware needed to secure door 16 to a portion of turret 11 adjacent a door opening 18 (FIG. 5). A door jam 22 around door opening 18 provides a weather seal between door 16 and turret 11.

An adjustable tool 23 (FIGS. 6-8) for forming a door includes a relatively stiff base member 24 connected to a frame member 28 by a plurality of adjustable-length bracing members 29. Frame member 28 includes a plurality of rectangular hollow tubings 30a-30h arranged in horizontal rows and a single rectangular tubing 31 connected at right angles to tubings 30a-30h. Base member 24 is connected to tubing 31 and the curvature of base member 24 is determined by the length of each of the bracing members 29.

Bracing members 29 (FIGS. 6-8) each include a threaded rod 34 having a rod bearing 35 at the upper end and a threaded knob 36 and inner nut 40 at the lower end. A bracket 41 is locked between knob 36 and nut 40 and bracket 41 is secured to one of the tubings 30a-30h by a bolt 42 and nut 43. Rod bearing 35 is connected to base member 24 by a shaft 47 and a connecting member 48. It should be understood that there are four bracing members 29 between each of the tubings 30a-30h and connecting members 48 as shown at tubing 30h. To reduce clutter on FIG. 6 several of the bracing members have been omitted.

The method of custom fabrication of a door to fit a predetermined door opening will now be described. A template 49 (FIGS. 3, 7) is made by coating a door jam 22 (FIG. 5) with a filled polyester paste. A foam material is then sprayed on the polyester paste to form the template 49 having an outer edge 54 which is a reverse image of door jam 22. When the foam has hardened template 49 is removed from door jam 22 and placed adjacent to base member 24 of tool 23 (FIG. 7). Bracing members 29 are adjusted by rotating knobs 36 and nuts 40 until the contour of base member 24 matches the contour of template 49. A dam 55 (FIG. 7) is temporarily secured around the edge of base member 24. Liquid plaster is poured into the space between dam 55 and template 49 to form a mold 59.

When the plaster in mold 59 hardens, dam 55 and template 49 are removed from tool 23 (FIG. 7) and mold 59 is clamped to base member 24. An area 60 inside mold 59 is filled with composite material to form a door having the same contour as base member 24 and having an outer edge which is a reverse image of an edge 61 of mold 59. Thus, the outer edge of door 16 formed in area 60 fits door jam 22 (FIG. 5) of opening 18 and the contour of the door matches the contour of turret 11 where the door is to be mounted.

The same tool 23 can be used with a variety of templates from different sizes and shapes of door opening to build doors to custom fit the door openings. The templates can be formed at a door opening and the templates shipped to another location for making the individual doors to exact size and shape on the adjustable tool.

Although the best mode contemplated for carrying out the present invention has been herein shown and described, it will be apparent that modification and variation may be made without departing from what is regarded to be the subject matter of the invention.

What is claimed is:

1. A method of molding a door to custom fit a door opening, said method including the steps of:
    forming a template inside said door opening with the outside of said template fitting the inside of said door opening,
    moving said template adjacent to a base member of an adjustable tool,
    adjusting the shape of said base member to correspond to the shape of said template to provide a first mold,
    forming a second mold to the shape of the outside of a door using said first mold including said template and said base member to shape said second mold,
    mounting said second mold on said base member to form a third mold, and
    placing composite material inside said third mold to form said door corresponding to the shape of said second mold and of said base member.

2. A method of molding a door as defined in claim 1 wherein the step of forming said second mold includes the further steps of positioning a dam around said template with said dam spaced apart from said template, and filling a space between said dam and said template with a material to form said second mold.

3. A method of molding a door as defined in claim 1 wherein the step of forming a template includes the further steps of coating an inside portion of said door opening with a filled polyester paste, spraying a foam material on said paste, and allowing said foam material to harden.

* * * * *